United States Patent
Velleca et al.

(10) Patent No.: US 7,934,022 B2
(45) Date of Patent: Apr. 26, 2011

(54) METHODS AND SYSTEMS FOR DERIVING CONNECTIVITY INFORMATION AMONG TELECOMMUNICATIONS DEVICES

(75) Inventors: Frank Velleca, Woodbury, CT (US); Donald Burdette, Manchester, CT (US)

(73) Assignee: The Siemon Company, Watertown, CT (US)

( * ) Notice: Subject to any disclaimer, the term of this patent is extended or adjusted under 35 U.S.C. 154(b) by 1041 days.

(21) Appl. No.: 11/717,935

(22) Filed: Mar. 14, 2007

(65) Prior Publication Data

US 2007/0238343 A1 Oct. 11, 2007

Related U.S. Application Data

(60) Provisional application No. 60/782,062, filed on Mar. 14, 2006.

(51) Int. Cl.
*G06F 13/00* (2006.01)
(52) U.S. Cl. ...................................................... 709/253
(58) Field of Classification Search .................. 709/220, 709/253
See application file for complete search history.

(56) References Cited

U.S. PATENT DOCUMENTS

| | | | |
|---|---|---|---|
| 5,161,988 A | 11/1992 | Krupka | |
| 5,483,467 A | 1/1996 | Krupka et al. | |
| 5,588,151 A | 12/1996 | Segal et al. | |
| 5,854,824 A | 12/1998 | Bengal et al. | |
| 6,421,322 B1 | 7/2002 | Koziy et al. | |
| 6,574,586 B1 | 6/2003 | David et al. | |
| 6,684,179 B1 | 1/2004 | David | |
| 6,725,177 B2 | 4/2004 | David et al. | |
| 6,961,675 B2 | 11/2005 | David | |
| 7,160,143 B2 | 1/2007 | David et al. | |
| 7,193,422 B2 | 3/2007 | Velleca et al. | |
| 2005/0058401 A1 | 3/2005 | Maynard et al. | |
| 2005/0111491 A1 | 5/2005 | Caveney | |
| 2005/0186819 A1 | 8/2005 | Velleca et al. | |
| 2006/0262727 A1 | 11/2006 | Caveney | |
| 2006/0281359 A1 | 12/2006 | Nordin | |
| 2006/0282529 A1 | 12/2006 | Nordin | |
| 2007/0032124 A1 | 2/2007 | Nordin et al. | |

OTHER PUBLICATIONS

International Search Report, PCT/US07/06417, Jul. 29, 2008.

*Primary Examiner* — Robert B Harrell
(74) *Attorney, Agent, or Firm* — Cantor Colburn LLP

(57) ABSTRACT

A system for deriving connectivity information among telecommunications devices. The system includes a system including a database identifying the telecommunications devices and ports associated with each of the telecommunications devices. A bus master consolidation point (BMCP) is in communication with the system over a network. A data and power consolidation point (DPCP) is in communication with the BMCP over a first bus connection. A patch panel is in communication with the DPCP over a second bus connection, the patch panel including a controller for transmitting and receiving port identification data. The patch panel forwards received port identification data to the DPCP over the second bus connection, the DPCP forwards receiving port identification data to the BMCP over the first bus connection and the BMCP the forwards port identification data to the system over the network. The system correlates received port identification data with the database to determine connectivity among the telecommunications devices.

28 Claims, 20 Drawing Sheets

Patch Panel with ID Chips

Example of an ID Chip Faceplate tracking a connection (in this case, an ID Chip Patch Cord)

US 7,934,022 B2

METHODS AND SYSTEMS FOR DERIVING CONNECTIVITY INFORMATION AMONG TELECOMMUNICATIONS DEVICES

CROSS-REFERENCE TO RELATED APPLICATIONS

This application claims the benefit of provisional patent application 60/782,062 filed Mar. 14, 2006, the entire contents of which are incorporated herein by reference.

BACKGROUND

Businesses and other organizations rely on their LAN infrastructure to run their daily operations. As the number of applications and the number of connections on the LAN increases, it becomes more difficult for customers to manage the network. The physical layer connections of the LAN need to be documented properly so the customer can make the best use of their network reduce network outages and increase security for their organization. There are existing products on the market that help customers manage the physical layer today. These systems are comprised of software that interfaces with scanner type devices that track and collect data on physical layer connections. Different methods are used to track physical layer connections. Two systems use a $9^{th}$ wire in a patch cord and contacts either in outlets or on patch panels to track connections between patch panels or patch panels and switches. A small current is run through the contacts and the data on the connections is collected in a scanner device and relayed to the software. Another system uses a time-based logic to infer connections between patch panels. In this scenario, when one end of a patch cord is connected to a panel, the system looks for a second connection on another panel and assumes that that is the other end of the patch cord. Finally, another type of system uses active jacks and uses their MAC and IP addresses to track connection.

There is a need in the art for improved systems and methods for tracking physical layer connections.

SUMMARY

A system for deriving connectivity information among telecommunications devices. The system includes a computer system including a database identifying the telecommunications devices and ports associated with each of the telecommunications devices. A bus master consolidation point (BMCP) is in communication with the computer system over a network. A data and power consolidation point (DPCP) is in communication with the BMCP over a first bus connection. A patch panel is in communication with the DPCP over a second bus connection, the patch panel including a controller for transmitting and receiving port identification data. The patch panel forwards received port identification data to the DPCP over the second bus connection, the DPCP forwards receiving port identification data to the BMCP over the first bus connection and the BMCP the forwards port connection identification to the computer system over the network. The computer system correlates received port identification data with the database to determine connectivity among the telecommunications devices.

DETAILED DESCRIPTION

Figure 1:
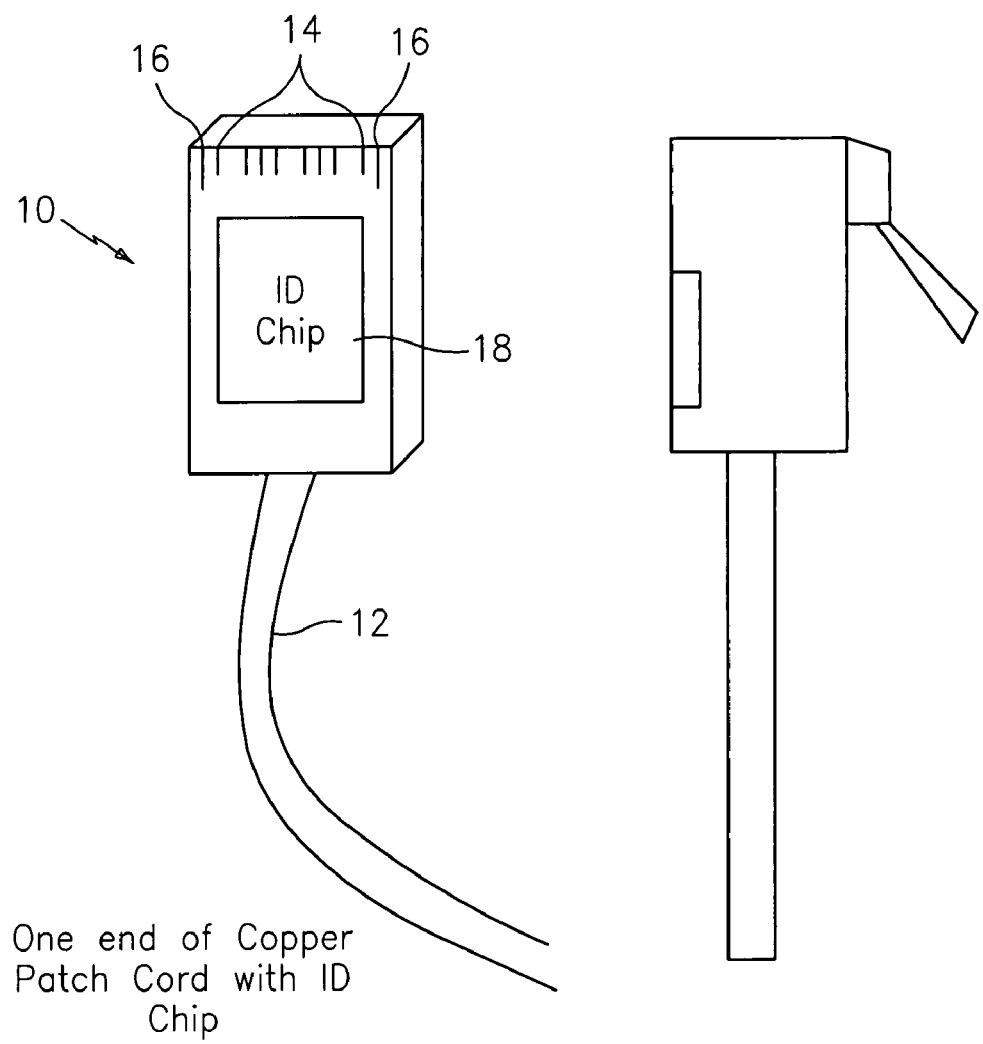
FIG. 1 illustrates a plug in embodiments of the invention.

FIG. 1 illustrates a plug 10 in embodiments of the invention. Plug 10 may be an RJ45 plug for termination with wires in cable 12. It is understood that embodiments of the invention may operate with a variety of different types of connectors, including fiber, multi-wire, co-axial, etc. The plug 10 includes contacts 14 for making electrical connection with the wires in cable 12. Additionally, plug 10 includes at least one contact 16 for communicating an identifier from a plug ID chip 18. The plug ID chip 18 carries a unique identifier that may be read over contacts 16 that are connected to pins on the ID chip 18. An exemplary ID chip is the MAXIM DS 2401 silicon serial number chip available from Dallas Semiconductor.

Figure 2:
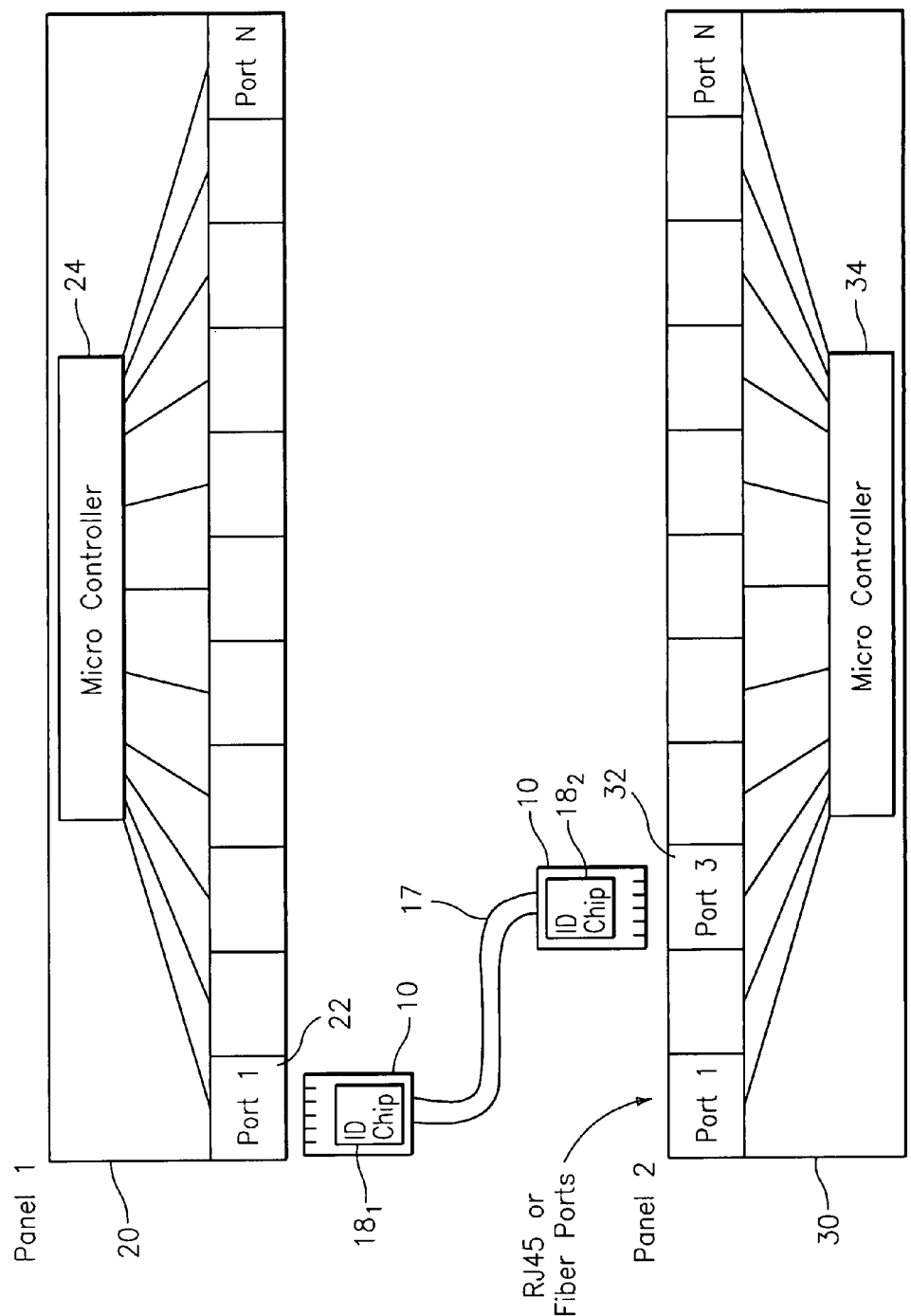
FIG. 2 illustrates a patch cord interconnecting two patch panels in embodiments of the invention.

FIG. 2 illustrates a patch cord 17 interconnecting two patch panels 20 and 30 in embodiments of the invention. The patch cord 17 includes two plugs 10 having ID chips $18_1$ and $18_2$. When plug 10 is mated with outlet 22, the identifier in ID chip $18_1$ is read by microcontroller 24. When plug 10 is mated with outlet 32, the identifier in ID chip $18_2$ is read by microcontroller 34. As noted above, plugs 10 include at least one additional contact for interfacing with the ID chips 18. Outlets 22 and 32 also include at least one additional contact for making contact with contacts 16 in plugs 10.

In operation, the controllers 24 and 34 poll each port 22 and 32 to obtain a plug identifier from the plug 10. Thus, each controller 24 and 34 collects data mapping a plug identifier to a physical port. As described in further detail herein, the controllers 24 and 34 provide the physical port data and identifier data to a collection node and a server which then summarizes the connections between the patch panels. For example, if both ID chips $18_1$ and $18_2$ transmit the same identifier, then it can be detected that port 1 of panel 24 is connected to port 3 of panel 30 by matching the identifiers. Of course, each chip $18_1$ and $18_2$ may store different identifiers. In this event, the two plug identifiers are associated with each other in a database as being ends of the same physical cord.

Placing ID chips on the plugs of a patch cord allows a patch panel, sensor device or work area passive or active component to read the patch cord identifier. The system can readjust one end of the patch cord even if the other end of the cord was disconnected. Existing systems need a cord to be connected between two devices to track the connection. This embodiment tracks a patch cord in only one port. This gives the user greater visibility/detail of their cabling infrastructure.

Figure 3:
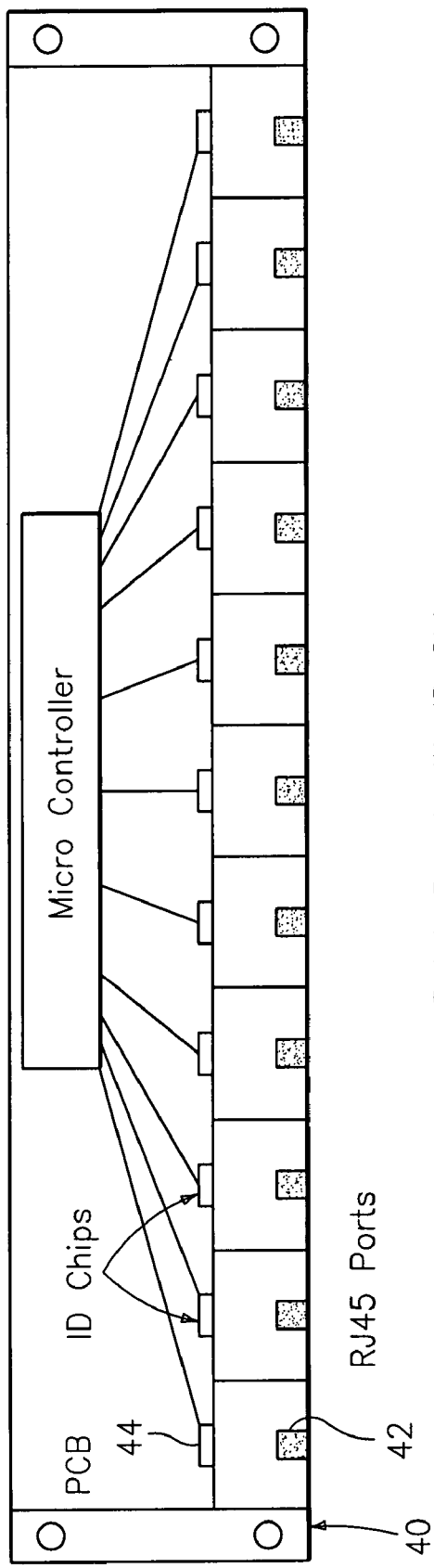
FIG. 3 illustrates a patch panel in embodiments of the invention.

FIG. 3 illustrates a patch panel in embodiments of the invention. In embodiments of the invention, the patch panel 40 includes ID chips 44 associated with outlets 42. The outlets 42 may include additional electrical contacts coupled to the ID chip 44 for transmitting the identifier from the ID chip 44 to another device as described in further detail herein. The ID chip 44 may be mounted on a printed circuit board (PCB) in the patch panel 40, the PCB also supporting the outlets 42.

Figure 4:
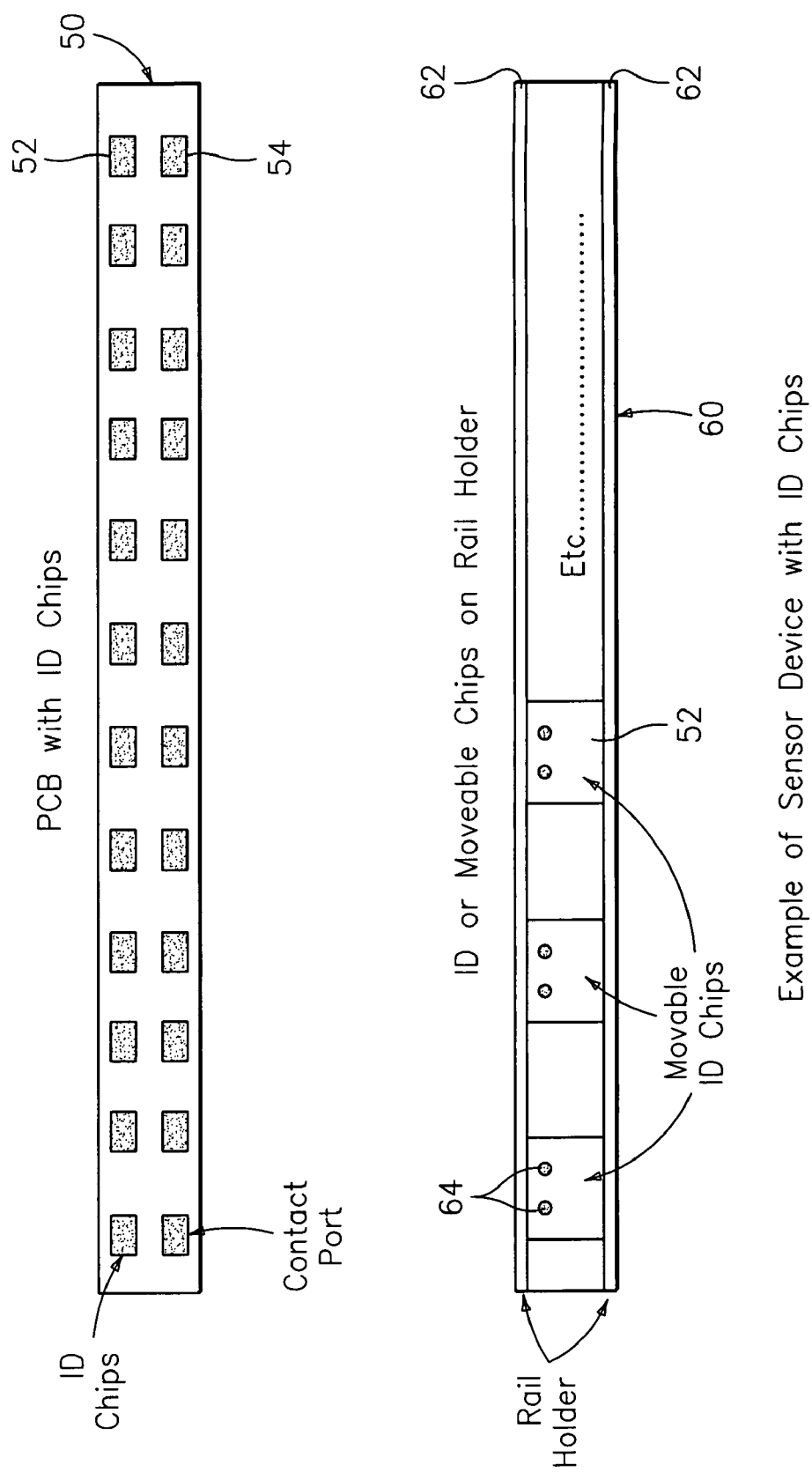
FIG. 4 illustrates mounting for ID chips in embodiments of the invention.

FIG. 4 illustrates alternate mounting for ID chips in embodiments of the invention. One embodiment includes a PCB 50 having ID chips mounted thereon. The number of ID chips and the spacing between the ID chips 52 corresponds to outlets on a piece of equipment such as a router, a switch, etc. The PCB 50 may be mounted above the ports 54 on the piece of equipment to associate each outlet with an ID chip 52. As described above, the ports 54 may include one or two contacts for making electrical contact with the ID chip 52. This allows the ID chip identifier to be transmitted on plugs mated with the ports 54.

Also shown in FIG. 4 is an alternate embodiment in which ID chips 52 are mounted in an ID chip holder 60. The chip holder 60 includes rails 62 which define U shaped channels within which the ID chips 52 may be moved laterally. This arrangement allows the ID chips 52 to be positioned so as to be aligned with outlets on a piece of equipment. When the ID chips 52 are positioned correctly, the ID chips 52 may be secured in place with a plate that applies slight pressure to the ID chips 52 to prevent movement. The chip holder 60 is then placed proximate to outlets on the piece of equipment. Contacts 64 on the ID chips 52 are placed in electrical contact with contacts in the outlets so as to provide the ability to transmit the ID chip identifier through the outlet.

In an alternate embodiment, the unique identification codes are generated by a controller (e.g., microprocessor). The contacts 64 may be coupled to the controller to output the unique identification codes. The connection between contacts 64 and controller may be flexible (e.g., a flex circuit connection) to allow the contacts 64 to be moved within rails 62 and remain in communication with the controller.

Figure 5:
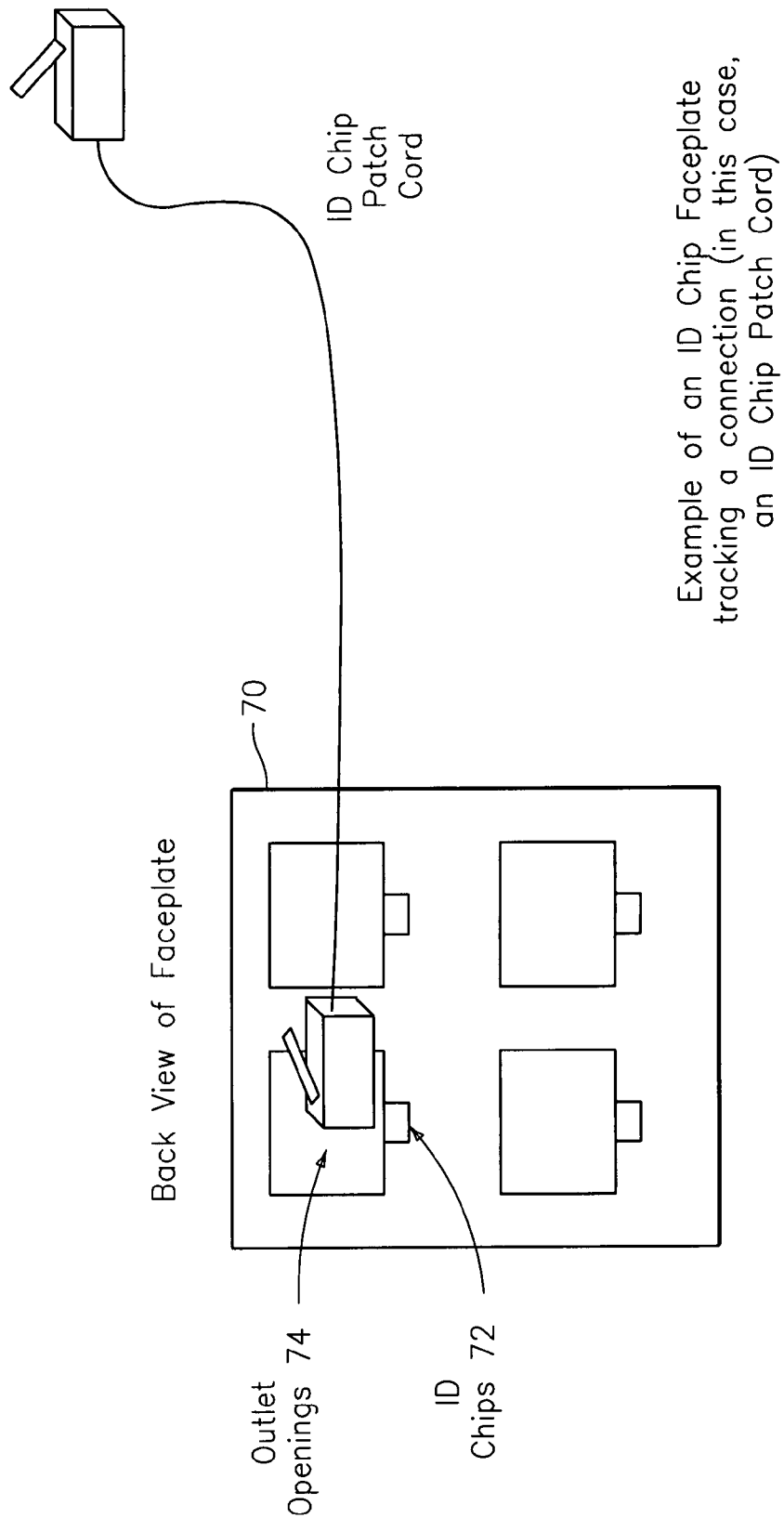
FIG. 5 illustrates a faceplate including ID chips in embodiments of the invention.

FIG. 5 illustrates a work area faceplate 70 including ID chips 72 in embodiments of the invention. In this embodiment, a work area faceplate having four outlets 74 includes ID chips 72 associated with each outlet 74. This allows the work area outlets 74 to be identified by the ID chip identifier on the ID chips 72. Again, the outlets 74 include at least one contact for transmitting the ID chip identifier along a patch cord.

Figure 6:
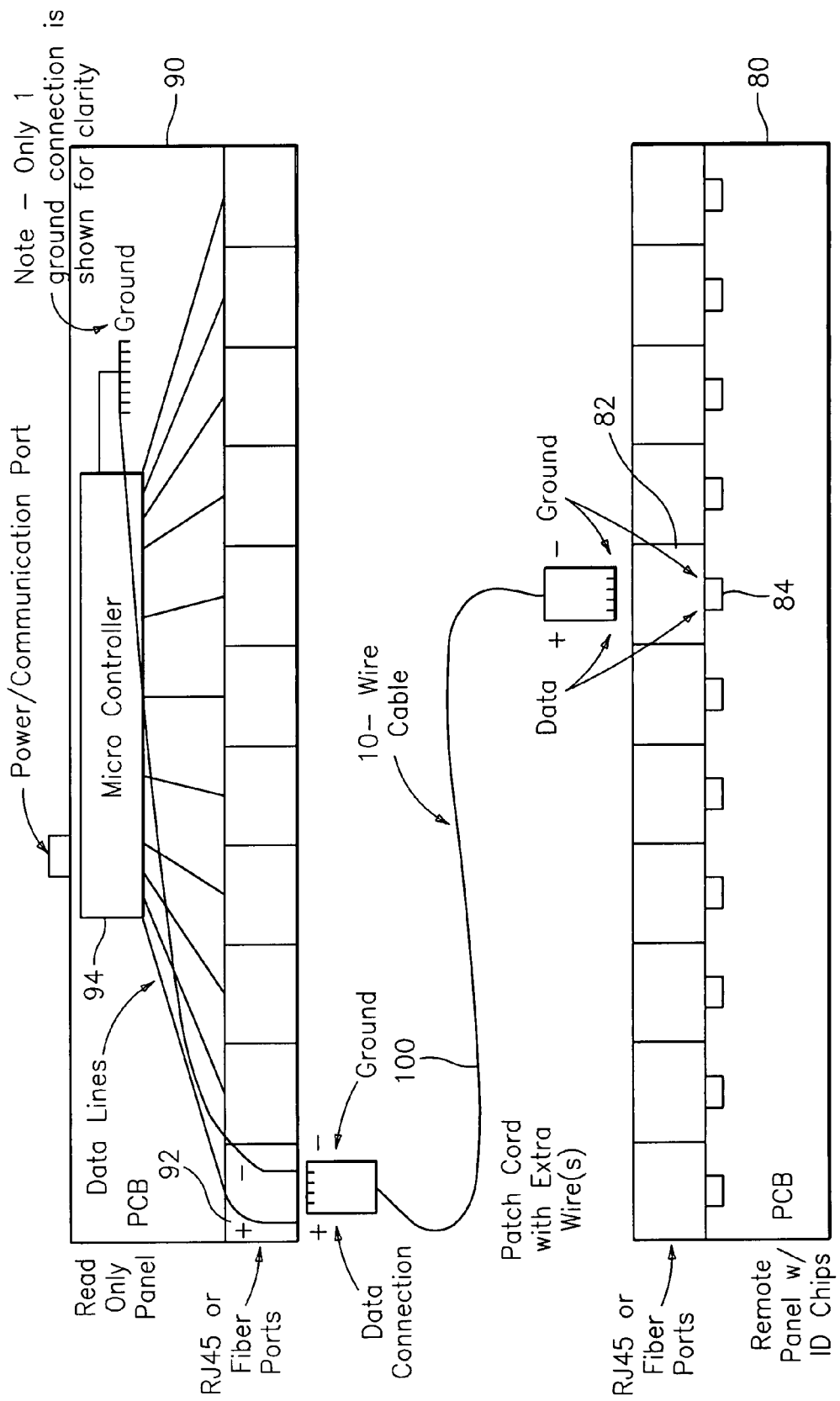
FIG. 6 illustrates two patch panels in embodiments of the invention.

FIG. 6 illustrates two patch panels 80 and 90 in embodiments of the invention. Patch panel 80 includes a number of ports 82, each associated with an ID chip 84. The outlet 82 includes two contacts, labeled data and ground, for transmitting the ID chip identifier along patch cord 100. Patch cord 100 has ten wires, eight for conducting signals from four pairs, and two contacts for the data and ground connections.

Patch panel 90 includes a number of ports 92 and a controller 94. The outlet 92 includes two contacts, labeled data and ground, for receiving the ID chip identifier along patch cord 100. Outlet 92 also includes eight contacts for receiving signals as known in the art. Controller 94 includes a number of data inputs connected to the data contact in outlet 92. The ground contact in outlet 92 is connected to a ground of the controller 94.

In operation, the controller 94 provides power to the ID chips 84 over the data (positive) and ground connections. The power may be 5 volts DC. When patch cord 100 connects outlet 92 to outlet 82, the ID chip 84 is powered and controller 94 reads the ID chip identifier over the data connection. Controller 94 knows that physical port 92 (e.g., the first port) is connected to a port having an identifier (e.g., 11111). This information is provided from the controller 94 to a collection node as described in further detail herein. The collection node interfaces with a server having a database mapping the identifier to a physical outlet on patch panel 80. Thus, the outlet 92 on patch panel 90 may be mapped to a physical outlet on patch panel 80. This embodiment uses a read panel 90 and a transmit panel 80 to derive the physical layout. This reduces the number of ID chips 84 and thus, the cost of the system.

Figure 7:
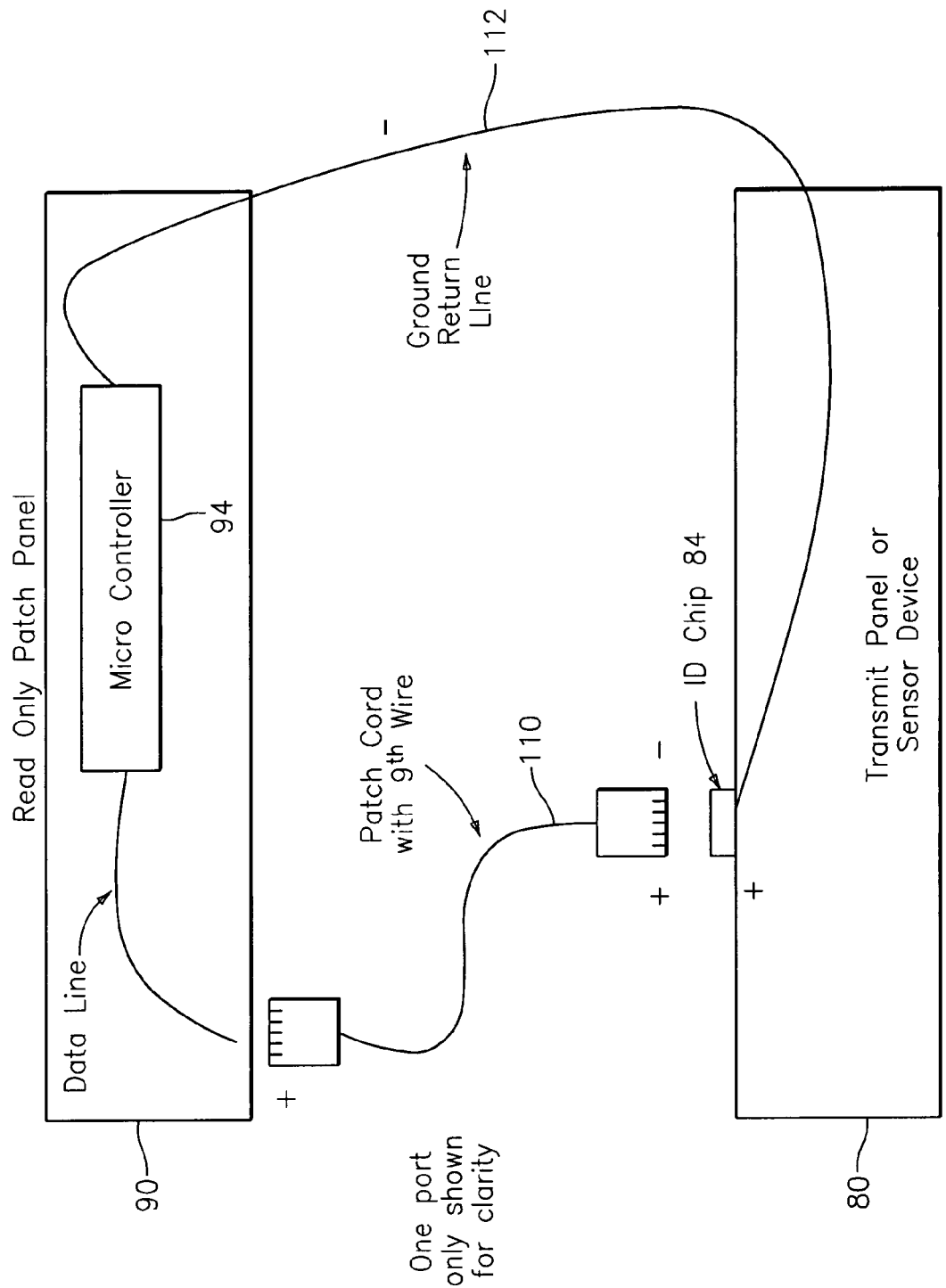
FIG. 7 illustrates two patch panels in embodiments of the invention.

FIG. 7 illustrates two patch panels in embodiments of the invention. FIG. 7 is similar to FIG. 6 except that a single wire is employed on patch cord 110 to transmit the data from ID chip 84. Power is provided on this single line from the controller 94 as described above. The ground connection between the ground of the ID chip 84 and the ground of the controller 94 is made through a separate connection 112. Thus, the patch cord 110 only requires a single additional wire to read the ID chip identifier.

Figure 8:
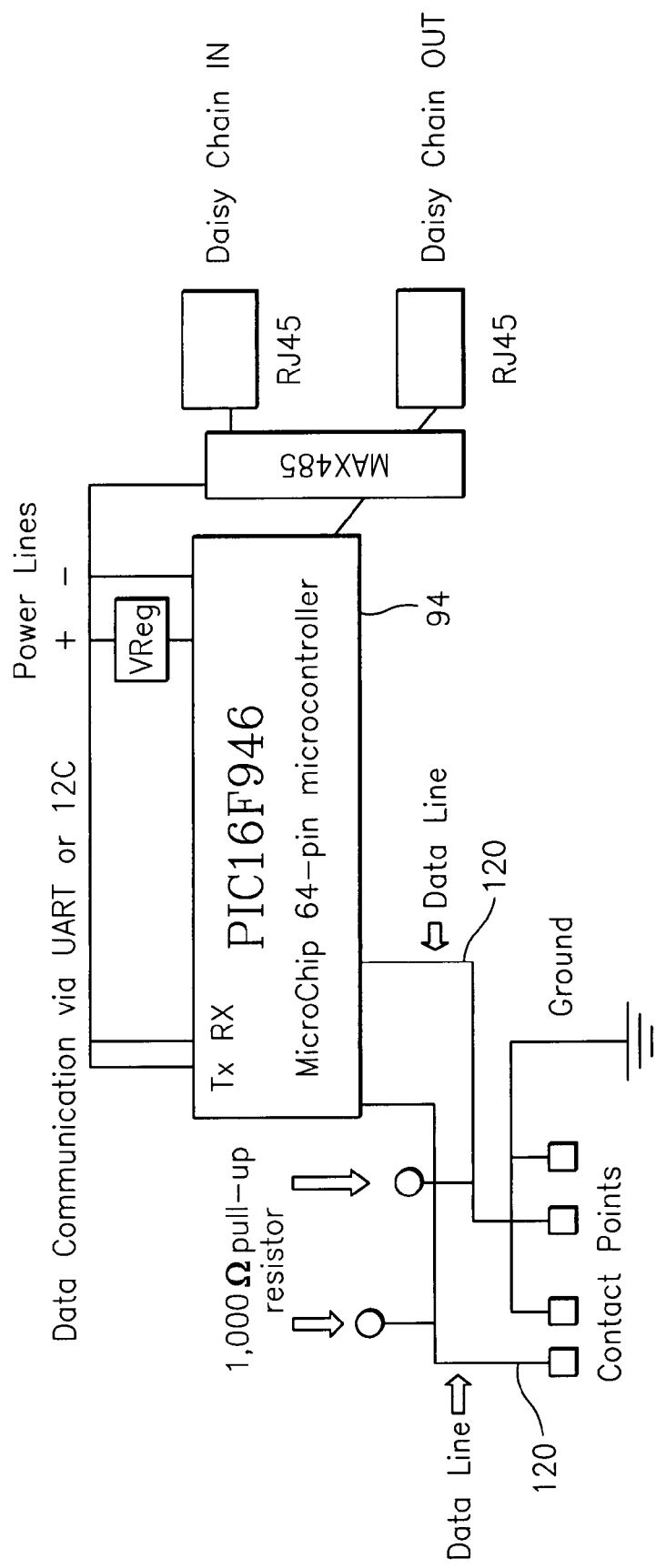
FIG. 8 illustrates an exemplary controller in embodiments of the invention.

FIG. 8 illustrates an exemplary controller 94 and associated components in embodiments of the invention. Data lines 120 are coupled to a data contact in outlets 92 of the patch panel 90. Controller 94 also includes a communication device having transmit (Tx) and receive (Rx) lines. The communication device may use known protocols such as UART or I2C. The controller may be in communication with other controllers along a bus and in communication with a collection node over the bus. FIG. 8 depicts RJ45 connections for serial in and serial out connections.

Figure 9:
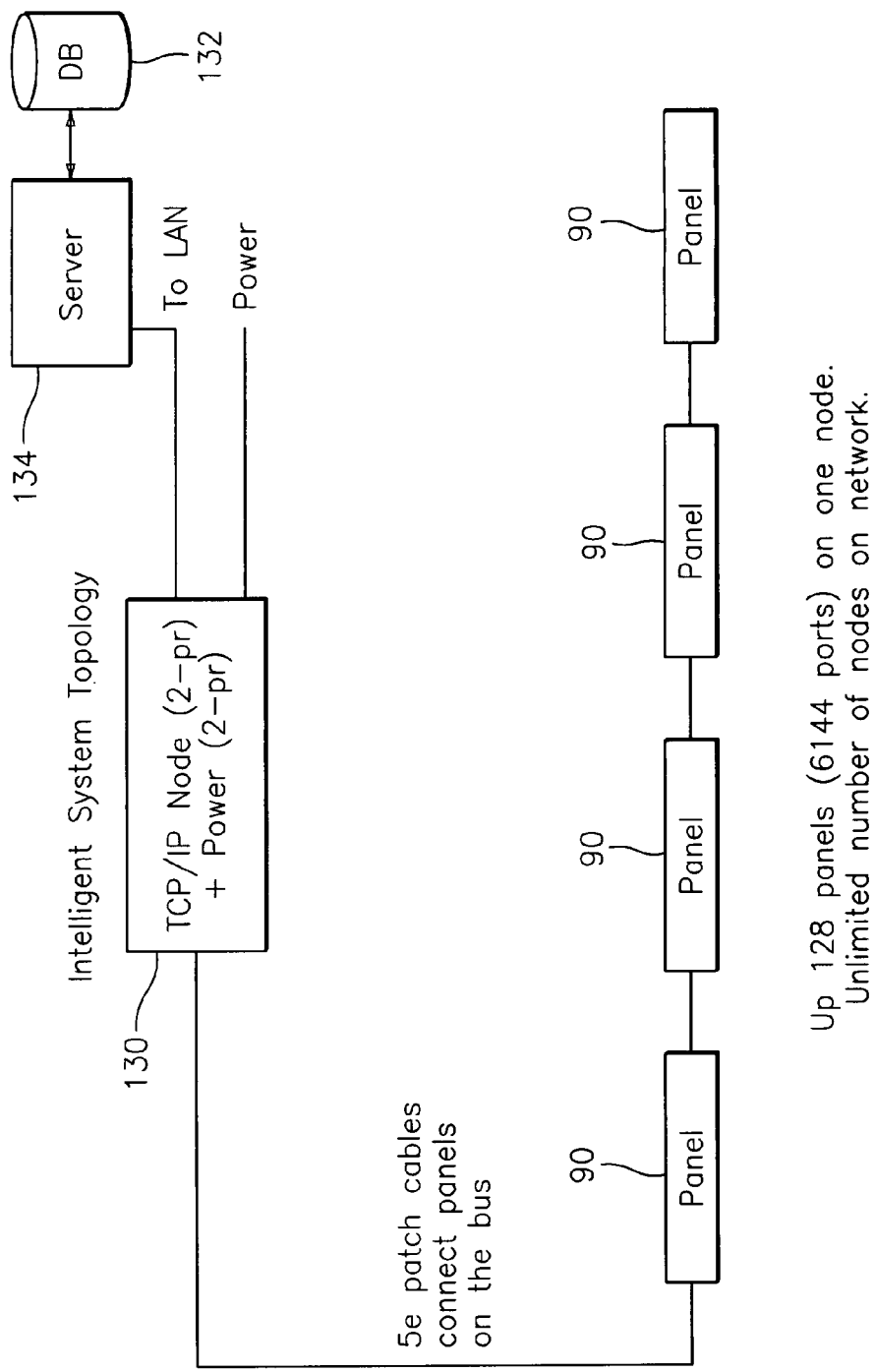
FIG. 9 illustrates multiple panels coupled to a node in embodiments of the invention.

FIG. 9 illustrates multiple panels 90 coupled to a collection node 130 in embodiments of the invention. As described above, the individual panels 90 provide the data relating physical outlets on panel 90 to a chip identifier on panel 80. The collection node 130 collects data from the panels 90 and forwards data to a server 134 running tracking software. The server 134 accesses a database 132 to determine the physical port on panel 80 corresponding to the ID chip identifier. This allows the physical port on panel 80 to be mapped to a physical port on panel 90. The server 134 may present the mapping to users over a LAN in a variety of formats (text, graphical, etc.).

The identification chips discussed above may be identification chips or may be controllers (e.g., microprocessors) that generate identification codes. The term identification element is used to encompass multiple types of devices that generate an identification code.

Although embodiments described above relate to copper connections, embodiments of the invention may be used to track both copper and fiber physical layer connections between patch panels in the telecommunications room, or track physical layer connections at the work area or consolidation point, or track connections between physical layer cabling products and LAN equipment. Embodiments of the invention reduce cost of complexity of tracking physical layer connections versus current systems and provide a means for an intelligent patching system to work in either an interconnect or cross-connect configuration. Embodiments of the invention minimize space required on racks in telecommunications rooms or data centers and may be used to provide additional details on products with embedded ID chips other than just location. Embodiments of the invention reduce power requirements for an intelligent cabling system and reduce the number of wires/connections required to track the physical layer and pass data to the server running the tracking software. Embodiments of the invention increase the reliability and longevity of the intelligent cabling system and improve and simplify how LAN port connections are tracked with a simpler sensor devices (e.g., ID chips) with movable ID chips.

Embodiments of the invention provide a lower total system installed cost. by eliminating scanner/analyzers/rack managers. Also, if implemented using the read only panels 90 and ID panels 80, the cost of software in server 134 is reduced as there are fewer ports that need to be monitored. Embodiments of the invention simplify the connections to feed data from the patch panels back to a collection node 130 to feed data to the network and tracking software application on server 134.

Embodiments of the invention provide a lower total cost of ownership of the system. Some of the components used in current intelligent systems are active components. Since these components require a large amount of power and some have moving parts, the lifespan of these products is typically 2-5 years. Customers typically expect passive cabling products to last up to 20 years. Embodiments of the invention offer an intelligent cabling product with a significantly longer life span than current products. This will reduce ongoing maintenance of the system, reducing total cost of ownership of the system.

Embodiments of the invention are easier to install than current systems since it uses fewer and simpler cables to connect back to a data collection node. Also, if implemented as a read only panel 90 and ID panel 80, the ID panel 80 does not require connections to the collection node 130 or server 134.

Embodiments of the invention require lower power consumption than current systems, therefore reducing cooling requirements in applications such as a telecommunications room.

Embodiments of the invention provide a simplified connection sensor device. In the embodiment of FIG. 4, the ID chips are placed on a surface of equipment in the field. The ID chips are arranged on a surface to align with port spacing of the device. This eliminates manufacturers from making a wide variety of sensor strips for a variety of different switches each with unique port spacing and/or port counts. Also, since the ID chips are read through the patch cord and read only patch panel 90, no connection cable is required to carry information back to the collection node/server from the ID chips. This reduces cost and simplify the installation for customers.

Embodiments of the invention also provide work area or consolidation point physical connection tracking. This is problematic for existing systems. Typically, other systems infer the physical layer connection when active devices are seen on the network. However, if an active device is not powered on or is removed from the work area, it is not possible to track the physical layer connection(s).

Embodiments of the invention use ID chips as described above. It is understood that other identification devices such as (but not limited to) magnetic ink (MICR), resistors, microcontrollers/microprocessor, electromagnetic sensors, etc. may be used. Embodiments of the invention are described with reference to patch panels which is intended to cover copper, fiber and other media used in physical layer connections.

Figure 10:
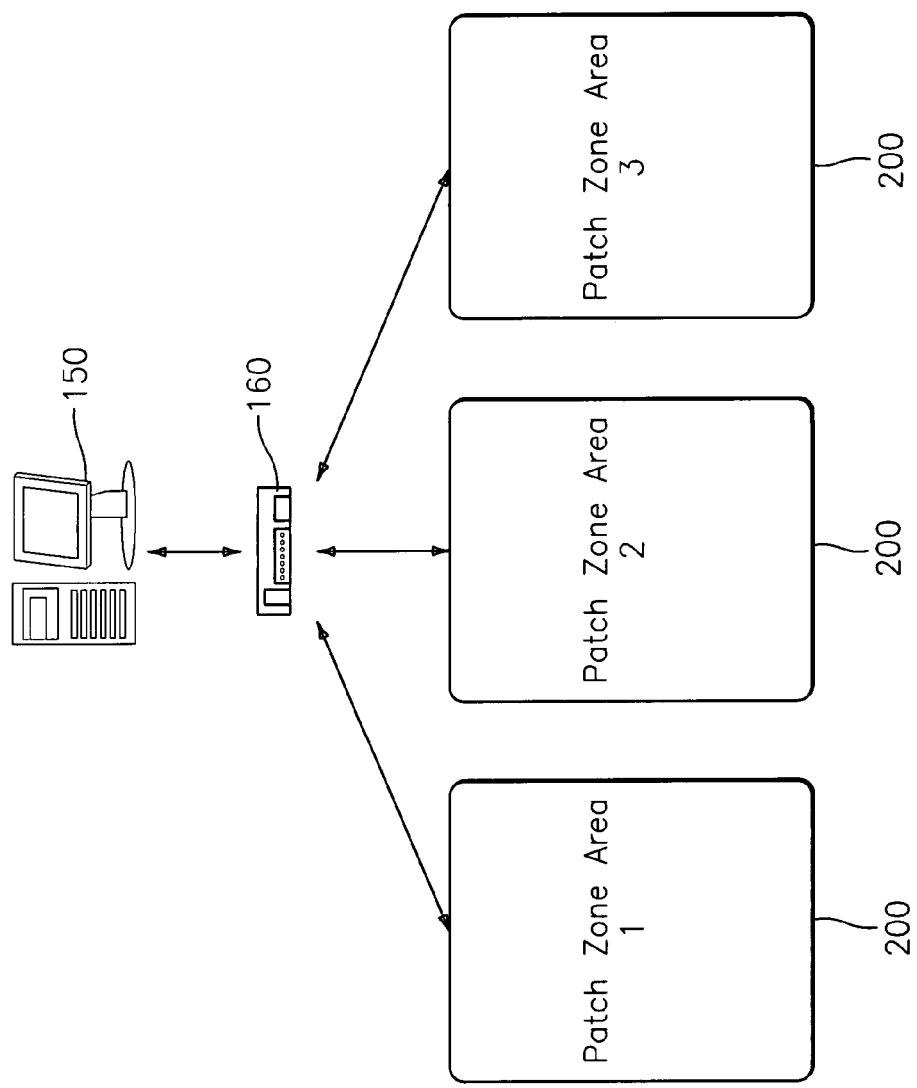
FIG. 10 is a high level diagram of an exemplary system for monitoring connectivity in alternate embodiments.

FIG. 10 is a high level diagram of an exemplary system for monitoring connectivity in alternate embodiments. A computer system 150 executes connectivity monitoring software and collects port identification data from a one or more patch zones 200. The patch zones 200 and the computer system 150 may communicate over an existing LAN through a switch 160 (e.g., Ethernet Hub). The computer system 150 maintains a database of hardware present in each patch zone, including port identification data. As described in further detail herein, patch panels in each path zone 200 forward port identification and their respective connection data to the computer system 150. The computer system 150 correlates the received port identification data with the database to determine complete connectivity within the system.

Figure 11:
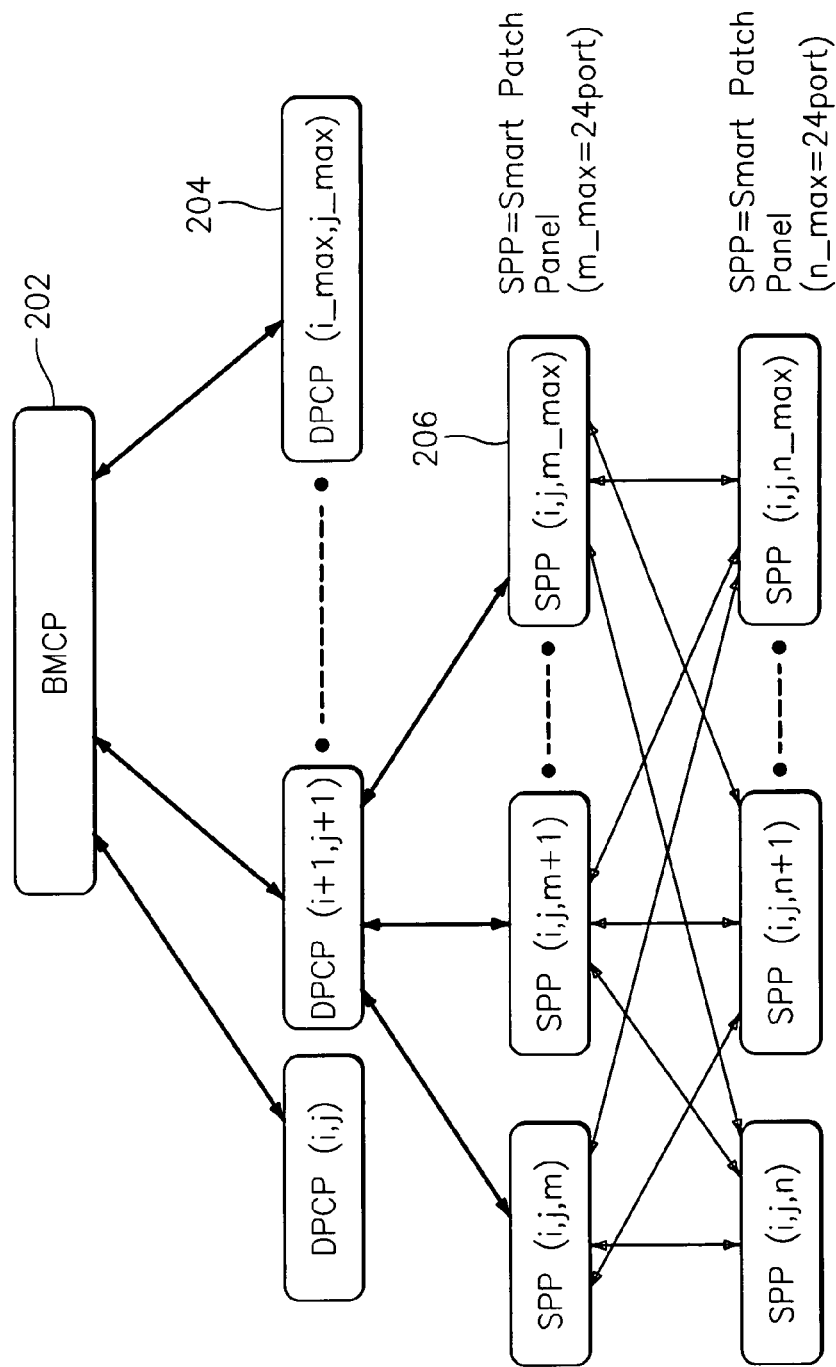
FIGS. 11-16 illustrate exemplary systems for monitoring connectivity in alternate embodiments.

FIG. 11 illustrates an exemplary patch zone 200. Patch zone 200 includes a bus master consolidation point (BMCP) 202 in communication with one or more data and power consolidation points (DPCP) 204. The BMCP 202 communicates with the DPCPs 204 using known communications protocols (e.g., RS485 bus). The DPCPs 204 are coupled to one or more smart patch panels (SPP) 206 (also referred to herein as patch panels). The DPCP 204 communicates with the SPPs 206 using known communications protocols (e.g., RS485 bus).

In operation, the SPPs 206 each send and receive port identification data at a contact pad associated with each port of the SPP 206. This port identification data is delivered to the DPCPs 204, and then forward to the BMCP 202. The BMCP 202 is in communication with computer system 150 over a network connection (e.g., Ethernet) through network equipment 160. As described further herein, computer system 150 correlates the received port identification data with a database of system elements to generate connectivity information which may be display to a user of the computer system 150, accessed by others having access to LAN, and provided back to the SPPs 206 for display at the SPP.

Figure 12:
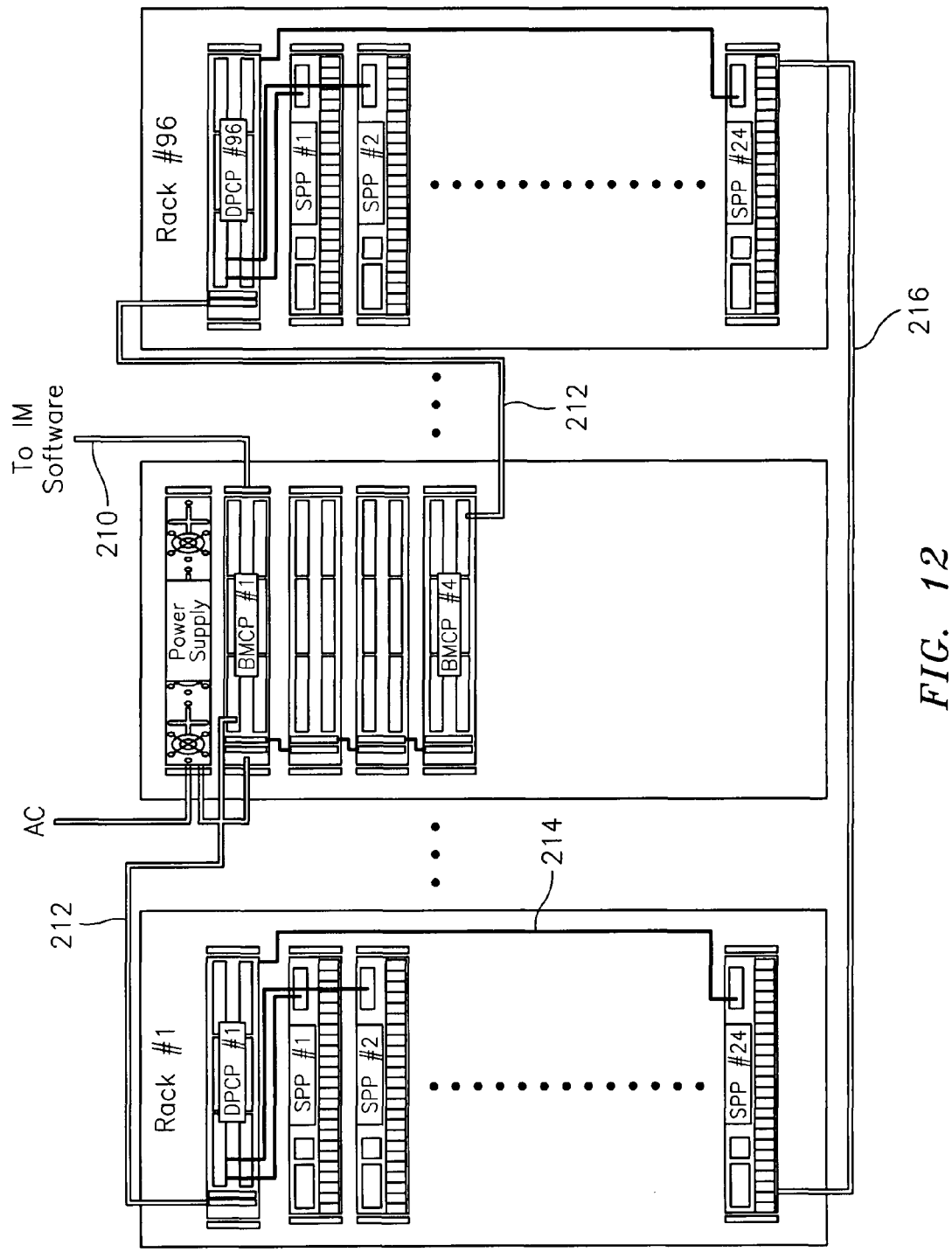

FIG. 12 illustrates an exemplary system for monitoring connectivity in alternate embodiments. FIG. 12 illustrates four BMCPs daisy chained in a rack. Each BMCP includes a daisy chain input and daisy chain output to enable linking the BMCPs in series. The BMCPs include microprocessors and coordinate collection of port identification data from the SPPs through the DPCPs. One BMCP communicates with the computer system 150 over a LAN connection 210. One or more BMCPs are coupled to DPCPs via a bus connection 212 (e.g., RS485).

The DPCPs include a number of connection points for establishing communication with individual SPPs via a bus connections 214 (e.g., RS485). Port identification data between individual ports on SPPs is transmitted using an additional conductor on a patch cord 216. As shown in FIG. 17, and described in further detail herein, each port 402 is associated with a contact pad 404. Patch cord 216 includes an additional conductor to electrically connect with the contact pad 404. Port identification data (i.e., time slot transmission) is transmitted on the extra conductor without disrupting data transmitted between the patch panels.

The above embodiments use a bus connection 212 between the BMCP and the DPCP and a bus connection 214 between the DPCP and the SPP. This allows power and data to be carried on a common bus. The data transmission from the BMCP can also be used to drive other types of communication from to and from the SPPs. The use of a single cable to supply data communications (for port connections and smart features) and power connections may be established using different pairs of a multi-pair cable resulting in a less complex installation than systems using separate paths for power and data. The data communication encompasses not only information on port connections and time slot assignments, but also can be used to transmit and receive communication to a controller embedded in a DPCP or SPP.

Figure 13:
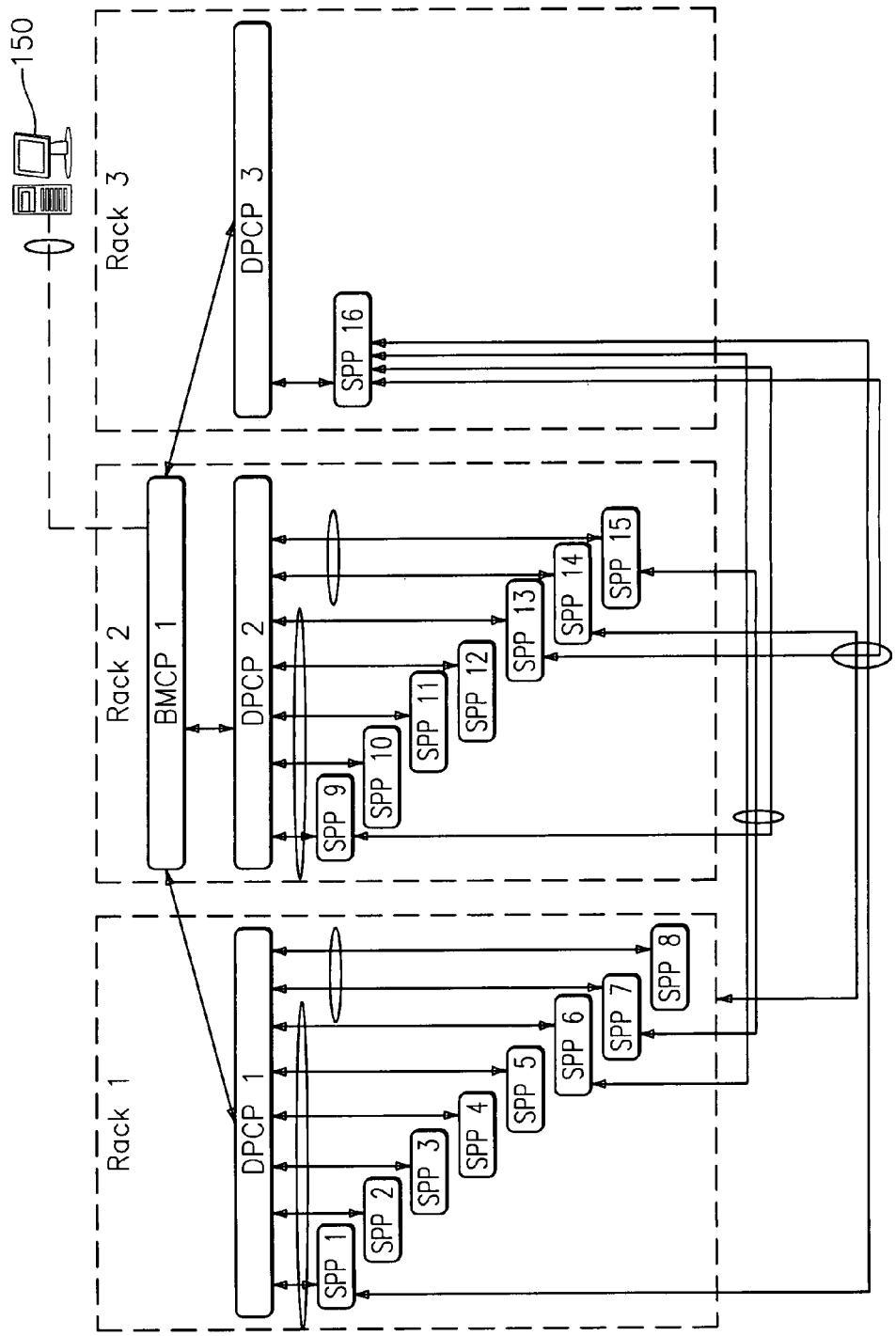

FIGS. 13-16 illustrate different configurations of SPPs, DPCPs and the BMCP. FIG. 13 illustrates a star configuration. In this example, a BMCP is in communication with three DPCPs in separate racks. Each DPCP makes a unique connection with each SPP in the respective rack. The DPCP includes a plurality of bus connections (e.g., RS485) that may be connected to an individual SPP. Various panel-to-panel connections are detected as described in further detail herein with reference to FIG. 18.

Figure 14:
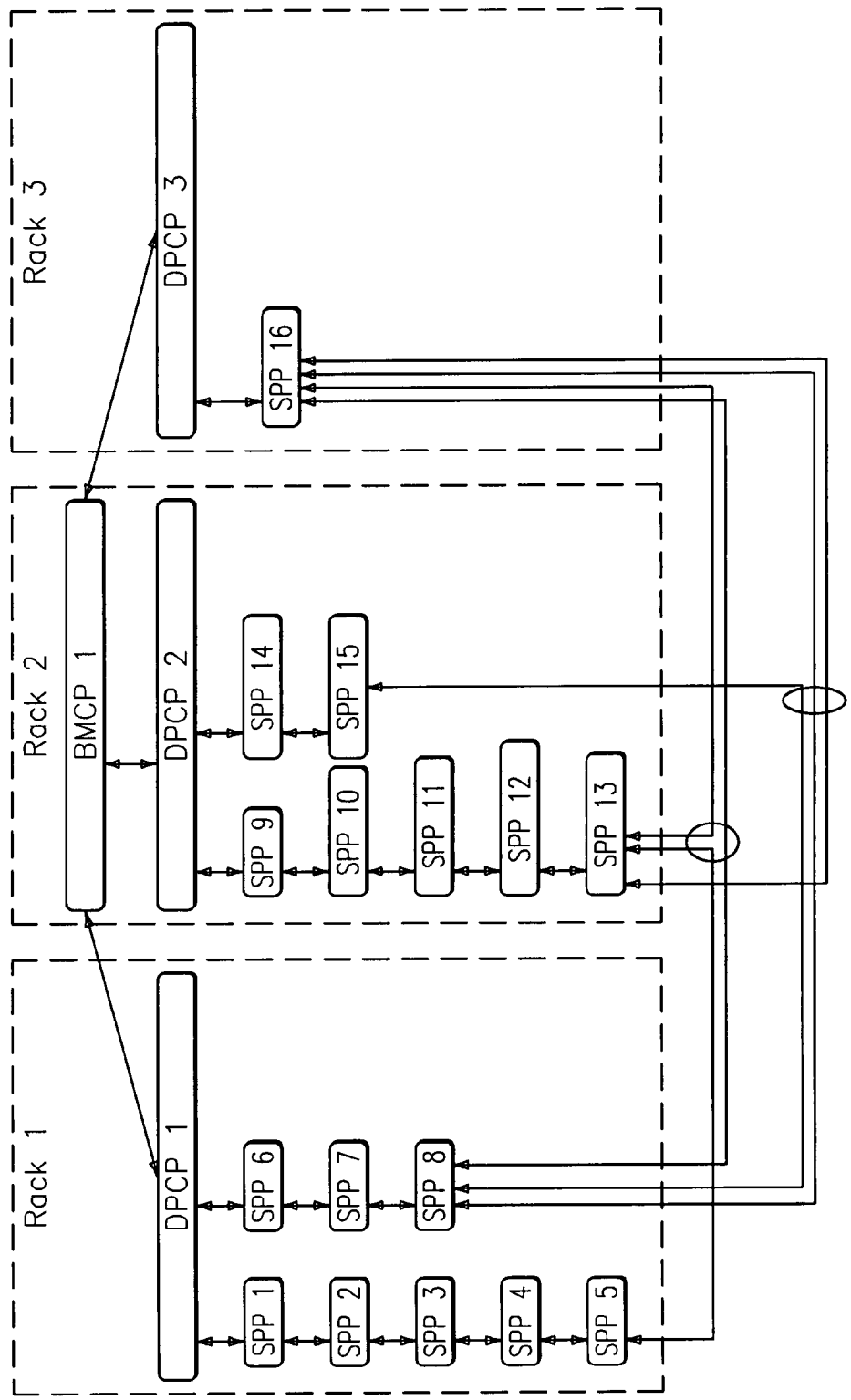

FIG. 14 illustrates another configuration, in which the SPPs are arranged in a series or daisy chain configuration. For example, a bus connection (e.g., RS485) on DPCP1 is connected to SPP1. SPP2 is communication with SPP1 through another bus connection (e.g., RS485), etc. Other chains of SPPs are connected to the DPCPs in series as shown in FIG. 14. Various panel-to-panel connections are detected as described in further detail herein with reference to FIG. 18.

Figure 15:
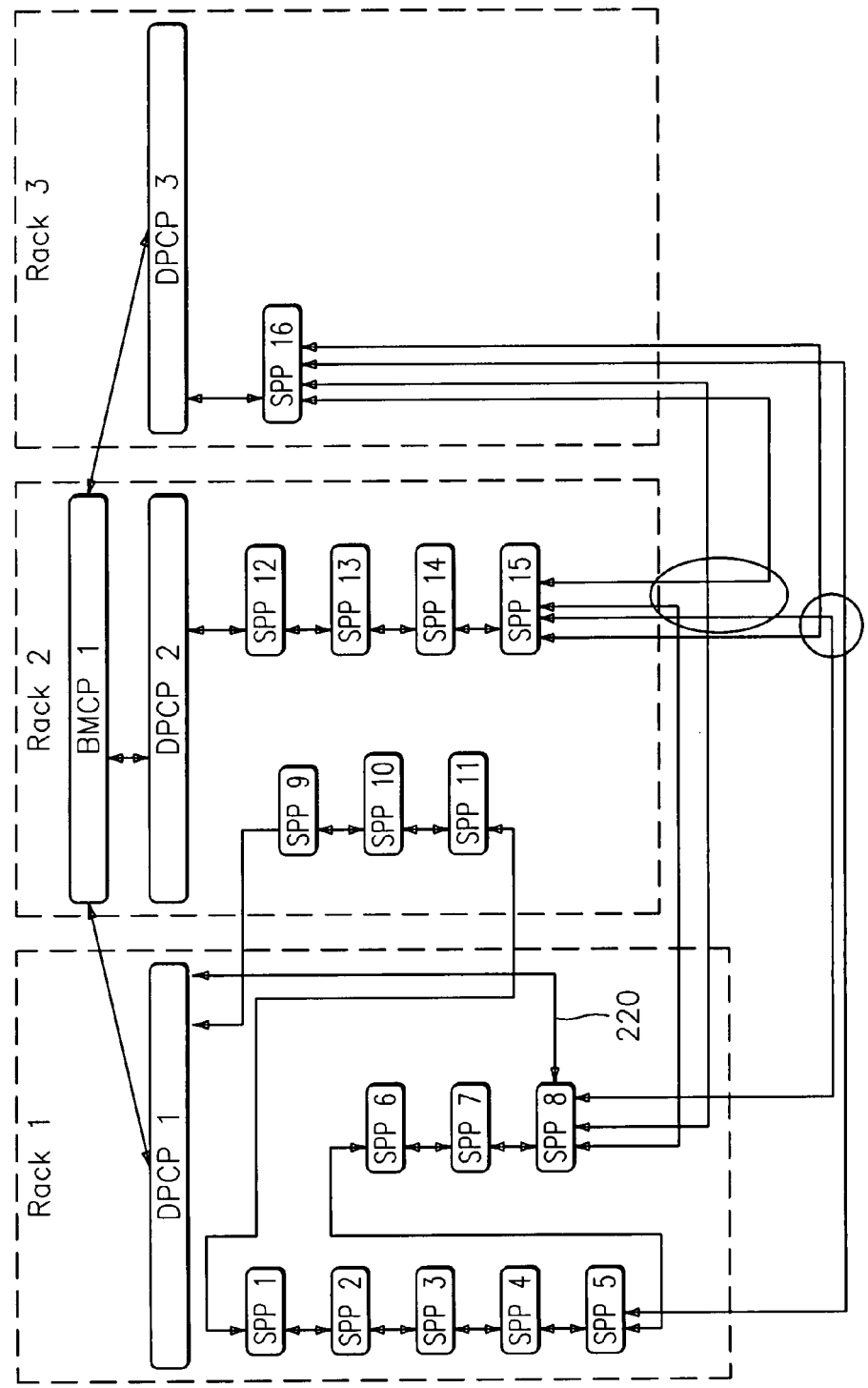

FIG. 15 illustrates another configuration, in which the SPPs are arranged in a series or daisy chain configuration and a redundant connection is included. SPPs 1-11 are connected in a daisy chain or series manner with a connection established between a bus connection at DPCP1 and SPP9. Furthermore, a redundant bus connection 220 is made between SPP8 and DPCP 1. This allows the port information to be provided to DPCP1 in the event that there is a defect in the bus connection between DPCP1 and SPP9. Various panel-to-panel connections are detected as described in further detail herein with reference to FIG. 18.

Figure 16:
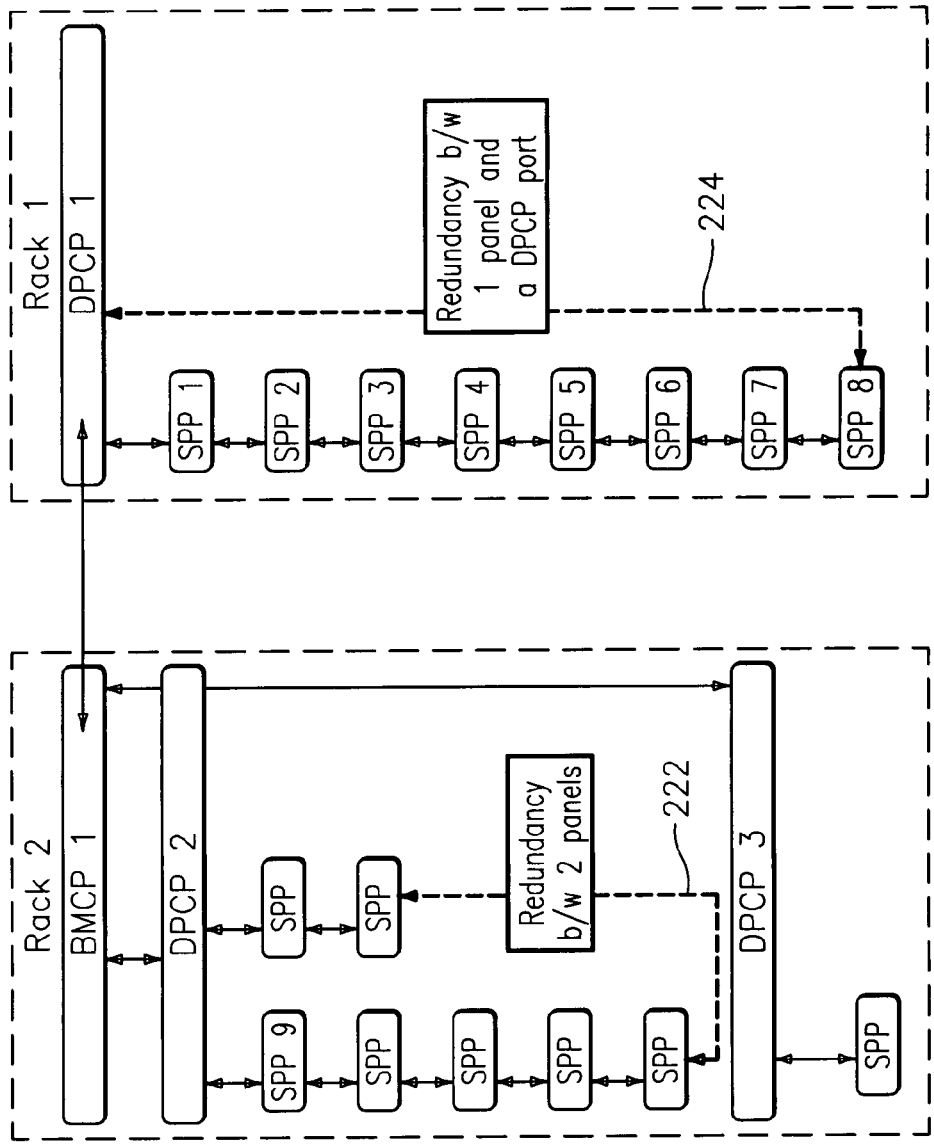

FIG. 16 illustrates another configuration, in which SPPs are arranged in a series or daisy chain configuration and redundant connections are included. DPCP2 is connected to a first daisy chain of SPPs including SPPs 9-13 and a second daisy chain of SPPs including SPP 14 and 15. A redundant bus connection 222 is provided between SPP13 and SPP15, the respective ends of the two daisy chains. DPCP1 is connected to a daisy chain of SPPs including SPP1-SPP8 and a redundant bus connection 224 is made from SPP8 back to a separate bus connection on DPCP1.

The configurations in FIGS. 11-16 include a BMCP and DPCPs. Other configurations may eliminate the need for DPCPs if the number of ports can be handled by the BMCP. Thus, a DPCP is not required for all installations.

Figures 17A, 17B:
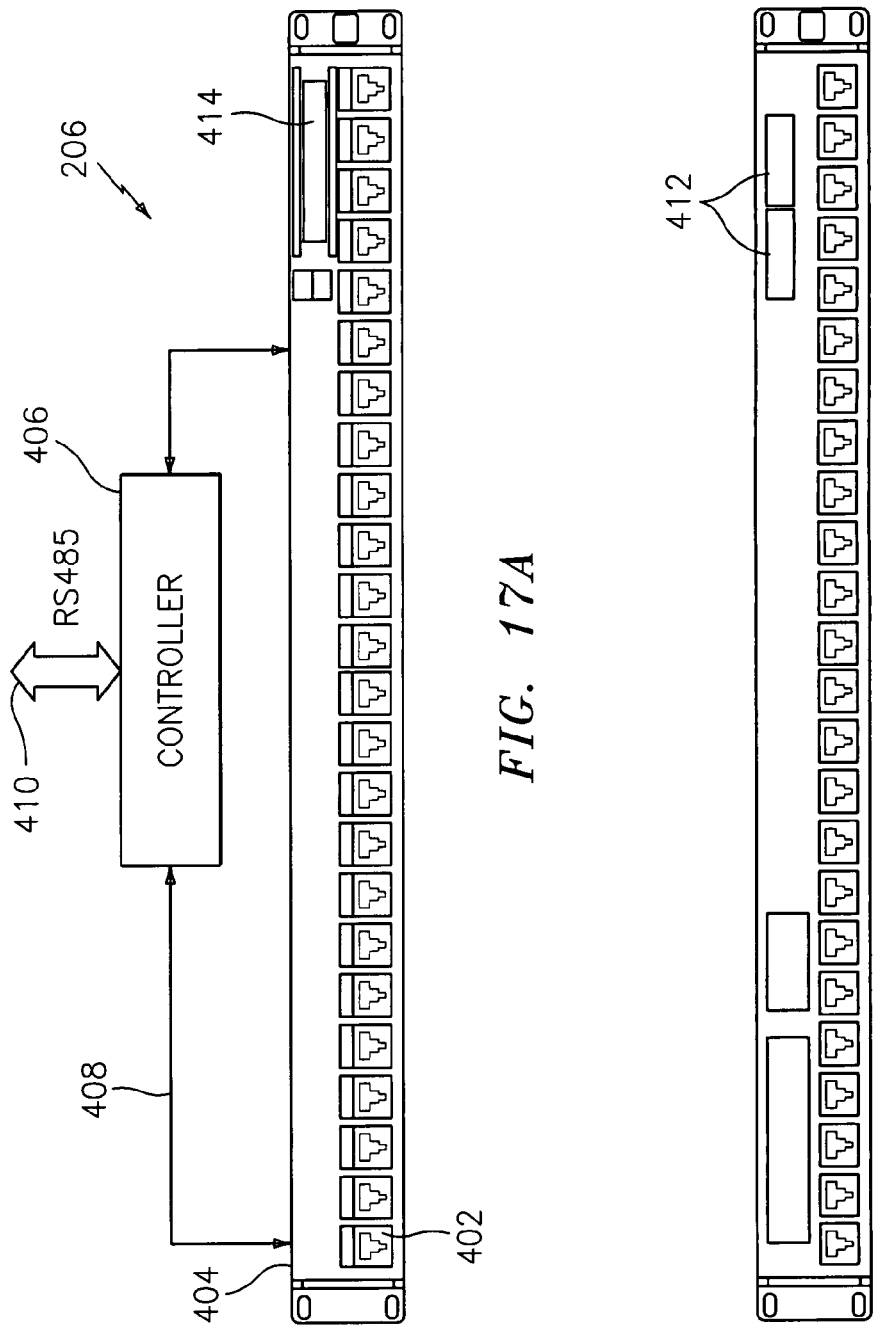
FIGS. 17A and 17B illustrate an exemplary patch panel in alternate embodiments.

FIGS. 17A and 17B illustrate an exemplary patch panel in alternate embodiments. As discussed above, each patch panel includes a number of ports 402 and a contact pad 404. The ports 402 receive patch cords as known in the art. The patch cords include an additional conductor for making electrical contact with contact pads 404. Such patch cords are disclosed in pending U.S. patent application Ser. No. 11/672,657, then entire contents of which are incorporated herein by reference. The SPP 206 includes a controller 406, that may be a general purpose microprocessor operating in response to executable code. The controller 406 (embedded in the patch panel) includes unique I/O connections 408 to the contact pads 404. This allows the controller 406 to send and receive port information to determine system connectivity. The controller 406 also includes a bus interface 410 (e.g., RS485) to communicate port information to a DPCP. Controller 406 is mounted on a circuit board, the circuit board removable from the patch panel 206 to facilitate maintenance.

A patch panel display 414 (e.g., an LCD, LED) may be used to present patch panel connection information to users, including information such as if a connection was made correctly, a technician is needed, a work order is open, a connection has been made incorrectly, a switch is connected, a patch cord needs to be connected or a patch cord needs to be disconnected. Further, LEDs may be included on the patch panel to indicate that a connection was made correctly or that a connection is waiting to be completed.

FIG. 17B depicts the rear of SPP 206. SPP 206 includes daisy chain input and output ports 412. This allows the SPPs 206 to be arranged in a series manner using a bus connection (e.g., RS485).

Figure 18:
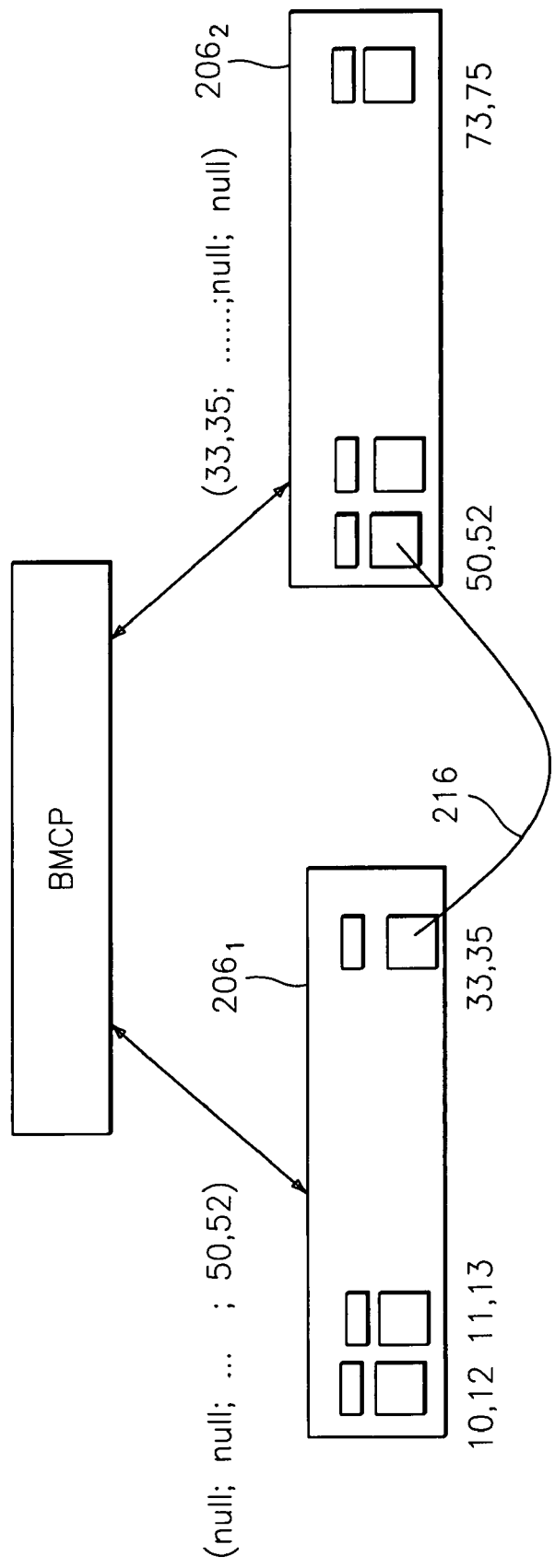
FIG. 18 illustrates monitoring connectivity of two patch panels in alternate embodiments.

Generation and transmission of the port information is now described. FIG. 18 illustrates collection of port information from two patch panels $206_1$ and $206_2$. In operation, the controller 406 in each SPP transmits port information to each port. The controller 406 also forwards received port information to the BMCP to derive connection information.

Embodiments of the invention use pulses transmitted on time slots to identify the various ports in the system. Each port is assigned a combination (e.g., two) time slots on which to send a signal (e.g., a pulse) to identify the port. When the patch panels are configured, the BMCP 150 predefines which time slots are assigned to each port and stores this information in a database. These may be referenced as a first time slot (time slot A) and a second time slot (time slot B). For example, to identify port 1 on patch panel $206_1$, pulses are sent to by controller 406 on time slots 10 and 12 to the contact pad 404 associated with port 1 as shown in FIG. 18. Similarly, pulses are sent by controller 406 to other contact pads 404 on other time slots as shown in FIG. 18 to uniquely identify each port 402. Patch panel $206_2$ also transmits pulses at predefined time slots for each port.

Each controller 406 transmits pulses on predefined time slots. Each controller 406 also reports received signals to the BMCP (either directly or through a DPCP). For example, as shown in FIG. 18, patch panel $206_1$ transmits port identification data to the BMCP. The port identification data identifies what was received on each port of the patch panel, in a port-by-port fashion. As the first several ports are not connected to a patch cord, a null value is sent to the BMCP for those ports. In the example of FIG. 18, the port identification data also indicates that the last port received pulses on time slots 50 and 52 as patch cord 216 connects the last port on panel $206_1$ to the first port on panel $206_2$ transmitting on time slots 50 and 52. Similarly, patch panel $206_2$ receives pulses on time slots 33 and 35 from panel $206_1$ and reports the received port identification data in the same manner.

The BMCP reconciles and forwards the port identification data over the LAN connection to the computer system 150. Computer system 150 correlates the received port identification data and associated connections (or lack thereof) in the patch zone and determines overall connections for the entire physical layer infrastructure. As the last port in patch panel $206_1$ is receiving time slots assigned to the first port of the second patch panel $206_2$, and vice versa, the BMCP 160 determines that these two ports are connected by a patch cord. The computer system 150 may display the connectivity information to a user. Further, connectivity information may be distributed back to the SPPs to allow service technicians to access the connectivity information through display 414 or a service device.

Figure 19:
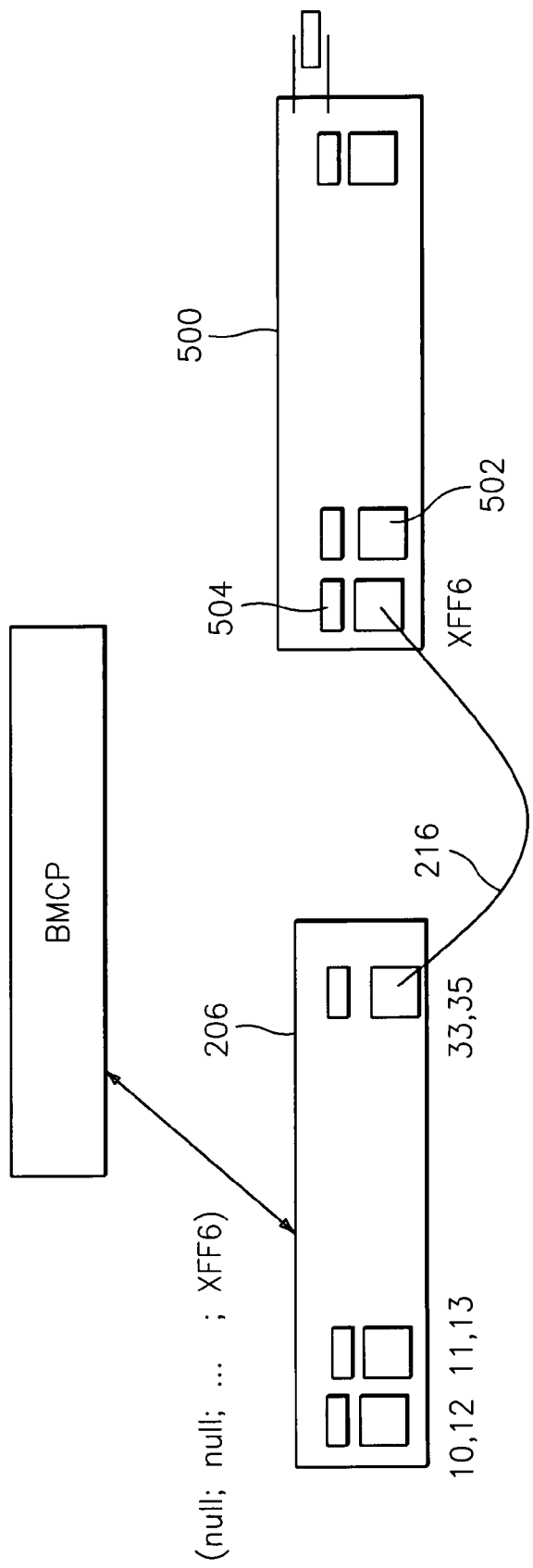
FIG. 19 illustrates monitoring connectivity of a patch panel and equipment in alternate embodiments.

FIG. 19 illustrates monitoring connectivity of a patch panel and equipment in alternate embodiments. In FIG. 19 a patch panel 206 is connected to a piece of equipment 500 (e.g., switch, router) by patch cord 216. In this scenario, the equipment 500 may be from a supplier that will not alter the equipment to transmit pulses on certain timeslots. In these embodiments, the equipment 500 is fitted with contact pads 504 and unique identification chips associated with each contact pad 504. The identification chips may be similar to those discussed above.

In operation, the identification chip in the equipment 500 sends a unique identification code through the contact pad 504. If a patch cord 216 is connected between the patch panel 206 to the port 502, the unique identification code is transmitted to the controller 406 in patch panel 206. Controller 406 may be programmed to recognize the identification code to prevent the time slot pulses from being sent to contact pad 404 and on to equipment 500. The controller 406 forwards any identification codes received from the equipment 500 to the BMCP along with the identity of the port on which the identification code was received. The computer system 150 then determines the connectivity based on the locations at which the unique identification codes were received.

A chip containing the identification code may be mounted to the equipment 500, along with contact pads 504, in a sensor strip assembly. Power to the sensor strip may be provided along the additional conductor in patch cord 216 to charge a capacitor 510. Periodically, the power on the additional conductor goes low and the identification chips are powered by the charged capacitor 510. The unique identification codes are transmitted while the conductor is low, and then power is reapplied to re-charge capacitor 510.

Figure 20:
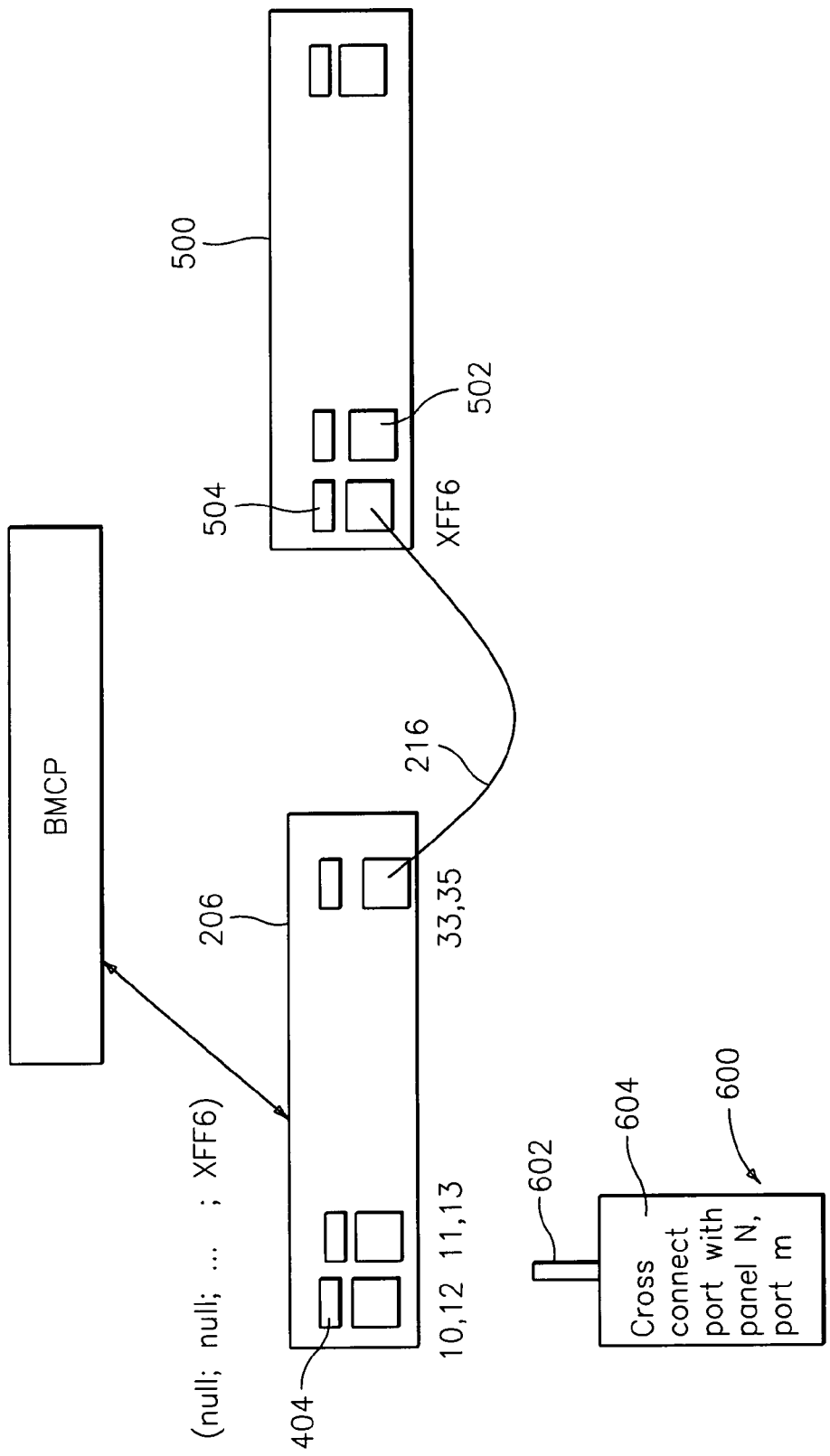
FIG. 20 illustrates a service device in exemplary embodiments.

FIG. 20 illustrates a service device 600 in exemplary embodiments of the invention. Service device 600 includes a display screen 604 and a probe 602. The probe 602 is a conductive member and when placed in electrical contact with contact pad 404, service information is provided on display screen 604. The service information may identify which port the interrogated port is connected to or other information such as where the port is to be connected, if a work order is outstanding, etc. This information is provided from the computer system 150 or BMCP 160 to the SPPs and managed by controller 406 in the SPP.

While the invention has been described with reference to exemplary embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed for carrying out this invention.

What is claimed is:

1. An apparatus for deriving connectivity information among telecommunications devices in a network, the apparatus comprising:
   a system including a database identifying the telecommunications devices and ports associated with each of the telecommunications devices;
   a bus master consolidation point (BMCP) in communication with the system over a network;
   a data and power consolidation point (DPCP) in communication with the BMCP over a first bus connection;
   a patch panel in communication with the DPCP over a second bus connection, the patch panel including a controller for transmitting and receiving port identification data;
   the patch panel forwarding received port identification data to the DPCP over the second bus connection, the DPCP forwarding port identification data to the BMCP over the first bus connection and the BMCP the forwarding port identification data and their associated connections to the system over the network;
   the system receiving port identification data and connection information and using said data to determine connectivity among the telecommunications devices in the network;
   wherein the patch panel includes a plurality of ports;
   the controller in the patch panel transmits a signal during a time slot, each time slot uniquely associated with one of the ports.

2. The apparatus of claim 1 wherein:
the patch panel receives port identification data from active equipment.

3. The apparatus of claim 2 wherein:
the active equipment includes an identification chip generating an identification code, the port identification data corresponding to the identification code.

4. The apparatus of claim 3 wherein:
power to the capacitor is interrupted when the identification chip transmits the identification code.

5. The apparatus of claim 2 wherein:
the active equipment is a switch.

6. The apparatus of claim 2 further comprising:
a capacitor coupled to the identification chip for providing power to the identification chip.

7. The apparatus of claim 2 wherein:
the patch panel includes a first contact pad associated with a first port;
the active equipment including a second contact pad associated with a second port;
a patch cord establishing electrical connection between the first port and the second port to provide power to charge the capacitor.

8. The apparatus of claim 1 wherein:
the patch panel includes a plurality of patch panels, the patch panels being connected in series from a single connection at the DPCP.

9. The apparatus of claim 8 further comprising:
a redundant connection from one of the patch panels in series to another connection at the DPCP.

10. The apparatus of claim 1 wherein:
the patch panel includes a plurality of patch panels, the patch panels being connected in a first series from a first connection at the DPCP and a second series from a second connection at the DPCP.

11. The apparatus of claim 10 further comprising:
a redundant connection from one of the patch panels in the first series to one of the patch panels in the second series.

12. The apparatus of claim 1 wherein:
the controller in the patch panel transmits the port identification data at a predetermined time.

13. The apparatus of claim 1 wherein:
the controller in the patch panel transmits a pulse during a pair of time slots, each pair of time slots uniquely associated with one of the ports.

14. The apparatus of claim 1 wherein:
the first bus connection transmits power and data using a single cable.

15. The apparatus of claim 1 wherein:
the second bus connection transmits power and data on a single cable.

16. The apparatus of claim 1 wherein:
the patch panel receives port identification data from another patch panel.

17. The apparatus of claim 1 wherein:
the DPCP includes a plurality of DPCPs in communication with the BMCP over multiple first bus connections; and the patch panel includes a plurality of patch panels in communication with the plural DPCPs over multiple second bus connections.

18. An apparatus for deriving connectivity information among telecommunications devices in a network, the system comprising:
- a system including a database identifying the telecommunications devices and ports associated with each of the telecommunications devices;
- an identification element associated with a patch panel, the identification element generating a unique identification code;
- the patch panel includes a plurality of patch panels, the patch panels being connected in series from a single connection at the DPCP;
- the system receiving the identification code to determine connectivity among the telecommunications devices in the network; and
- a redundant connection providing an alternate bus connection to the series of patch panels.

19. The apparatus of claim 18 wherein:
the patch panels are connected in the first series from the first connection at the DPCP and a second series from a second connection at the DPCP.

20. The apparatus of claim 19 further comprising:
a redundant connection from one of the patch panels in the first series to one of the patch panels in the second series.

21. The apparatus of claim 18 wherein:
the redundant connection extends from one of the patch panels in series to another connection at the DPCP.

22. An apparatus for deriving connectivity information among telecommunications devices in a network, the system comprising:
- a system including a database identifying the telecommunications devices and ports associated with each of the telecommunications devices;
- a patch panel in communication with the system over a bus connection, the patch panel transmitting and receiving port identification data;
- the patch panel forwarding received port identification data to the system over the bus connection;
- the system correlating received port identification data and connection information and using said data to determine connectivity among the telecommunications devices in the network;
- wherein the patch panel transmits the port identification data at a predetermined time, the patch panel includes a plurality of ports and a controller in the patch panel transmits a signal during a time slot, each time slot uniquely associated with one of the ports.

23. The apparatus of claim 22 wherein:
the controller in the patch panel transmits a pulse during a pair of time slots, each pair of time slots uniquely associated with one of the ports.

24. The apparatus of claim 22 wherein:
the bus connection transmits power and data using a single cable.

25. The apparatus of claim 22 wherein:
the controller is mounted on a circuit board, the circuit board removable from the patch panel.

26. An apparatus for deriving connectivity information among telecommunications devices in a network, the system comprising:
- a system including a database identifying the telecommunications devices and ports associated with each of the telecommunications devices;
- an identification element associated with a patch panel, the identification element generating a unique identification code;
- a capacitor coupled to the identification chip for providing power to the identification element;
- the system receiving the identification code to determine connectivity among the telecommunications devices in the network.

27. The apparatus of claim 26 wherein:
power to the capacitor is interrupted when the identification element transmits the identification code.

28. An apparatus for deriving connectivity information among telecommunications devices in a network, the system comprising:
- a system including a database identifying the telecommunications devices and ports associated with each of the telecommunications devices;
- an identification element associated with one of a patch cord, patch panel and sensor strip, the identification element generating a unique identification code;
- the system receiving the identification code to determine connectivity among the telecommunications devices in the network;
- wherein the identification element is an identification chip movably mounted on the patch panel.

* * * * *